United States Patent Office 3,153,474
Patented Oct. 20, 1964

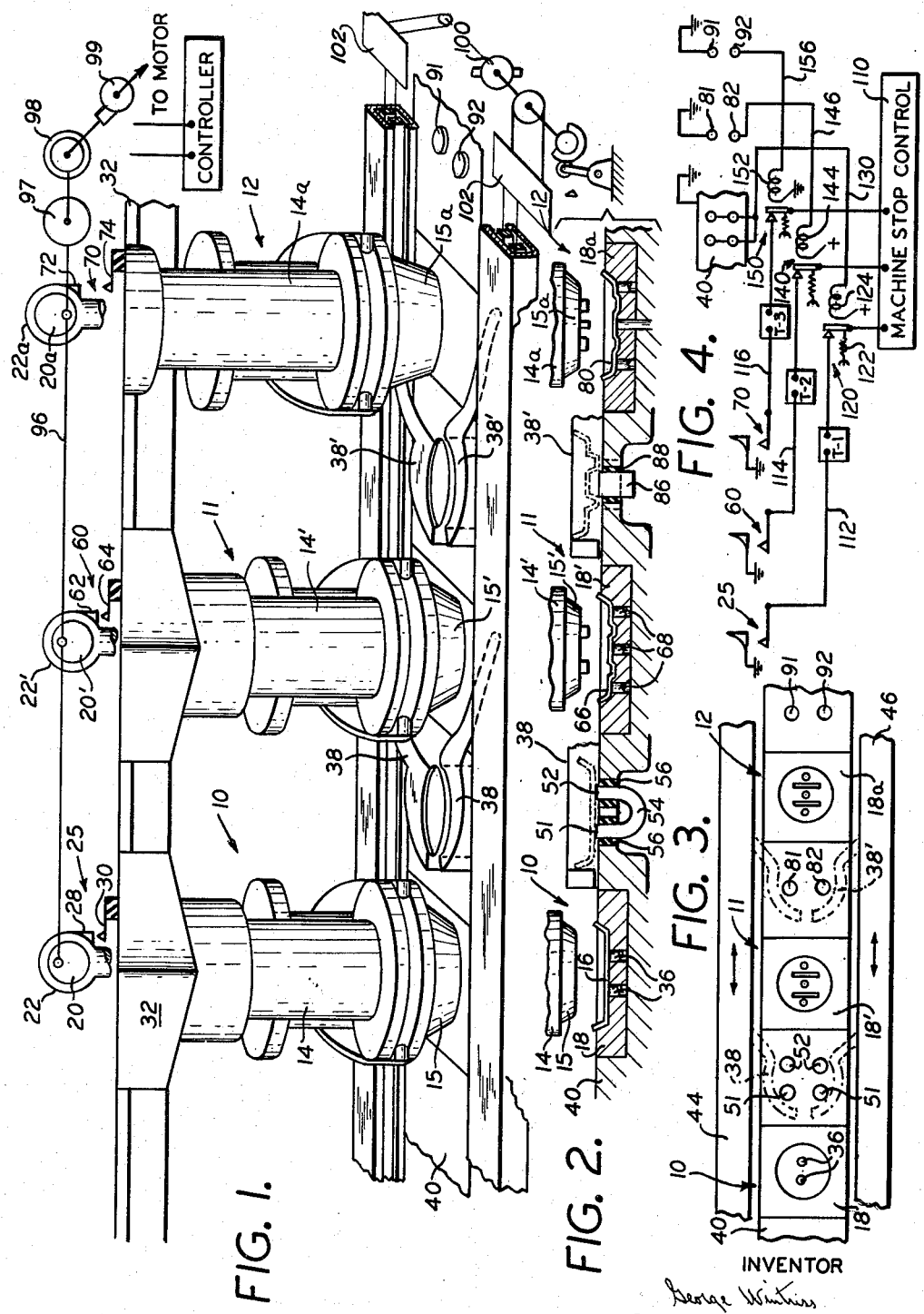

3,153,474
MAGNETIC CONTACT SIGNAL DEVICE FOR AUTOMATIC MACHINES
George Wintriss, Carversville, Pa.
Filed Sept. 7, 1962, Ser. No. 222,082
12 Claims. (Cl. 198—40)

This invention relates to apparatus for producing signals for controlling the operation of automatic machines, and more especially to apparatus for controlling the stopping of machines in the event that a part is not delivered in accordance with the intended operation of the machine. The delivery may be from a machine having a single work station, or it may be a transfer of a work piece or stock from one work station to another in a multistage machine.

One object of the invention is to provide improved apparatus for controlling the operation of automatic machinery by means of signals responsive to the movement of the work piece through a predetermined course in the cycle of the machine. Another object is to provide apparatus for producing controlled signals without the use of feelers or fingers or other detectors which are moved by a work piece. Experience has shown that movable detectors which are shifted by a work piece often become damaged as a result of rough handling and inexpert adjustment.

Another object is to provide control apparatus, responsive to the passage of a work piece, which requires no adjustment and which has no movable parts with which the work piece comes in contact.

This invention uses rigid contacts along a path traveled by a work piece, and the invention has magnetic means that hold the work piece to a path along which the work piece will always touch the contact. In the preferred construction, the contact itself is a magnet.

The invention can be used with one contact insulated from a support along which a work piece travels. With this construction, the work piece may ground a circuit by touching the contact and simultaneously touching the support or mechanism that moves the work piece along the support. In another form of the invention there are two contacts placed close enough together so that a work piece will touch them both simultaneously to complete a circuit. In accordance with one feature of the invention, where two contacts are used, they are poles of different magnets.

Other objects, features and advantages of the invention will appear or be pointed out as the description proceeds.

In the drawing, forming a part hereof, in which like reference characters indicate corresponding parts in all the views:

FIGURE 1 is a diagrammatic view of an automatic machine embodying this invention and with successive work stations and means for transporting a work piece from one work station to another;

FIGURE 2 is a diagrammatic sectional view of the apparatus shown in FIGURE 1;

FIGURE 3 is a diagrammatic top plan view of the dies in the successive work stations shown in FIGURES 1 and 2, the signal-producing contacts being shown between the dies of successive work stations; and FIGURE 4 is a wiring diagram for the apparatus shown in the other figures.

The automatic machine shown in FIGURE 1 has a plurality of work stations 10, 11 and 12. At the work station 10 there is a ram 14 which brings a tool 15 downwardly into position to force a blank 16 into a die 18. The ram 14 is reciprocated toward and from the die 18 by an eccentric 20, operating a motion-transmitting connection 22 which raises and lowers the ram 14. Such operating mechanism is well-known in the art and no further description of it is necessary for a complete understanding of this invention.

There is a switch 25 at the work station 10. This switch includes a contact 28, on the motion-transmitting connection 22, in position to touch a contact 30 carried by a fixed frame 32 of the machine. This switch 25 is closed each time the ram 14 approaches its lowermost position.

The blank or work piece 16 is ejected from the die 18, as the tool 15 moves away from the die, by ejection pins 36, in accordance with conventional practice. The work piece 16 is then transferred to the work station 11 by a conveyor having arms 38 which grip the work piece 16 and which advance the work piece along a table or support 40.

These arms 38 extend from housings 44 and 46 on opposite sides of the table 40 and there are linkages in the housing for moving the arms 38 into and out of contact with the work pieces and for advancing the arms from one work station to the next, and then back again, after releasing a work piece, to transfer the next work piece from one work station to the next.

Between the work stations 10 and 11 there are contacts 51 and 52. In the construction illustrated, there are two pairs of contacts 51 and 52. Each of these contacts extends upwardly for a short distance beyond the surface of the table 40, along which the work piece slides, so that the work piece touches one or more of the contacts as it passes from the work station 10 to the work station 11.

The contacts 51 and 52 are opposite poles of a horseshoe magnet 54 and they are electrically insulated from the table 40 by bushings 56. The magnetism of these contacts 51 and 52 holds the work pieces down in a path extending lengthwise of the surface of the support or table 40 and in which the work pieces touch the contacts 51 and 52 as the work pieces pass these contacts.

At the work station 11 there is a ram 14' which moves a tool 15' toward and from a die 18'. The ram 14' is operated by an eccentric 20' through a motion-transmitting connection 22'. An electric switch 60 is associated with the ram 14' and includes a contact 62, carried by the motion-transmitting connection 22', and a contact 64 on a resilient arm supported from the fixed frame 32 of the machine. As in the case of the ram 14 the switch 60 is closed each time that the ram 14' moves the tool 15' into a position adjacent to the die 18'.

A work piece transferred from the work station 10 to the work station 11 is deposited by the conveyor arms 38 in the die 18'. The work piece in this die 18' is indicated, in FIGURE 2, by the reference character 66. After being operated upon in the die 18', the work piece 66 is ejected by pins 68 and is moved by conveyor arms 38' from the work station 11 to the work station 12.

At this third work station 12 there is a ram 14a which moves a tool 15a toward and from a die 18a. The ram 14a is operated by an eccentric 20a through motion-transmitting connections 22a. There is a switch 70 associated with the die 14a. As in the case of the other switches, the switch 70 is closed each time that the tool 15a moves close to working relation with the die 18a. The switch 70 includes a contact 72 carried by the motion-transmitting connection 22a; and another contact 74 on a resilient arm supported from the frame 32 of the machine.

The apparatus illustrated may have other work stations, and in any event, will have means for delivering a work piece 80 from the die 18a to a delivery chute or conveyor at the discharge end of the machine.

Between the work stations 11 and 12 there are contacts 81 and 82, extending slightly above the top surface of the table 40. In the construction illustrated, each of the contacts 81 and 82 is the upper end of a bar magnet 86, electrically insulated from the table by a bushing 88. Similar contacts 91 and 92 are located beyond the work station 12.

The operating mechanism for the machine is shown diagrammatically in FIGURE 1. The eccentrics 20, 20′ and 20a are operated by a drive shaft 96 rotated by a clutch 97, the driving side of which is connected with a flywheel 98.

The flywheel 98 is driven, through a transmission 99, from a motor 100. This motor also drives mechanism 102 which controls the operation of the transfer or conveyor arms 38 and 38′, and such other conveyor arms as are required to deliver the work pieces from the work station 12. Thus, the arms and conveyor are operated in time relation to one another by power supplied from a single motor 100. The particular operating mechanism for the rams and conveyor forms no part of the present invention and no detailed illustration of it is necessary since such automatic machines are well known in the art.

Control means are provided for stopping further operation of the machine in the event that the machine fails to function properly at any work station. If a work piece is not ejected from one of the dies, that die may be damaged or destroyed by continued operation of the machine if a new work piece is moved into the die and superimposed on the work piece which has not been ejected. The apparatus for stopping further operation of the machine may stop the motor by shutting off the power and by applying a brake; but quicker response can be obtained by disengaging clutches since this makes it unnecessary to overcome the inertia of the motor and flywheel. The disengagement of clutches need not throw the different parts of the machine out of timed relation because jaw clutches can be used which engage in only one position, or the elements which move in timed relation can be operably connected with one another beyond the clutch.

In order to simplify the illustration and explanation of this invention, a controller 110 is shown for stopping operation of the machine by means of a solenoid clutch or switch, or any other conventional apparatus for stopping automatic machines.

The operation of the invention will be understood from the wiring diagram shown in FIGURE 4. The switches 25, 60 and 70, upon closing, ground conductors 112, 114 and 116, respectively.

The conductor 112 leads from a timer T–1 which is supplied with power through a switch 120 from the controller 110. The switch 120 is held in closed position by a spring 122, and opens only when power is supplied to a switch-operating coil 124.

Whenever the switch 25 is closed, by operation of the ram and tool with which that switch is associated, the timer T–1 begins to operate. After a predetermined period of operation of the timer T–1, the controller 110 stops the operation of the machine. In order for the machine to continue operation, after momentary closing of the switch 25, the operation of the timer T–1 must be interrupted before the end of the period for which this timer T–1 is adjusted and this interruption is effected by closing a circuit 130 leading from the contacts 51 and 52. The circuit 130 is closed whenever a work piece simultaneously touches the grounded support or table 40 and any one of the contacts 51 and 52.

Closing of the switch 60 starts a timer T–2 which causes the machine to stop unless the operation of the timer T–2 is interrupted by opening of a normally-closed switch 140 located between the timer T–2 and the controller 110. This switch 140 is opened by the energizing of a switch-operating coil 144 in a circuit 146 with the contacts 81 and 82. The circuit 146 is grounded whenever a work piece simultaneously touches the contacts 81 and 82.

The closing of the switch 70 starts operation of a timer T–3 which causes the machine to stop unless the operation of the timer T–3 is interrupted by opening of a switch 150 having an energizing coil 152 connected with a circuit 156 leading to contacts 91 and 92.

Although two different areas of contacts, along the table 40, have been illustrated, it will be understood that various combinations can be made whereby contacts or groups of contacts are located at transversely-spaced regions across a wide table. In any event, the transverse spacing of the contacts which project from the table 40 must be less than the width of a work piece when the contacts are connected, so that the work piece touches them both simultaneously and establishes a circuit between them; and the transverse spacing must be limited so that a work piece cannot pass between them when the contacts are wired so that a circuit is closed by simultaneous touching of a work piece with a contact and the supporting table.

The feature of the invention by which the contacts are magnetic is useful with ferrous metal work pieces because the magnetic attraction insures firm contact of the work piece with the contact over which it passes. The invention can be used, however, with nonmagnetic work pieces where the pieces are heavy enough to insure good contact with the various contact elements along the table, or where the contacts extend far enough above the table so that the upward displacement of a work piece, upon striking a contact, will insure sufficient contact pressure to close a circuit.

In its broader aspects, the touching of the work piece with the contacts along the transfer table produces signals for controlling the operation, and more specifically the stopping, of the machine. These signals are used in electronic control equipment to produce instantaneous responses; and the simplified wiring diagram of FIGURE 4 is for the purpose of illustrating the principle of operation of the invention.

From the foregoing description it will be apparent that this invention controls the operation of an automatic machine without the use of feelers, fingers or other parts which are moved by contact with the work pieces.

The preferred embodiment of the invention has been illustrated and described, but changes and modifications can be made and some features can be used in different combinations without departing from the invention as defined in the claims.

What is claimed is:

1. Control signal apparatus for automatic machines having a work station and a supporting surface along which a work piece travels after leaving said work station, an electric contact at a location on said surface in the path followed by the work piece, and a magnet in position to hold the work piece down in a path along said surface to insure touching of the contact by said work piece.

2. The control signal apparatus described in claim 1 characterized by the electric contact extending through said surface and for a short distance above the surface, and said electric contact being the magnet.

3. The control signal apparatus described in claim 1 characterized by the supporting surface being a conductor of electricity and the contact being insulated from said surface, but in position to be touched by a work piece that is also touching said surface, and an electric control circuit closed by a work piece touching the contact and said surface simultaneously.

4. The control signal apparatus described in claim 1 characterized by two contacts located close together on said supporting surface with the contacts in positions to be touched simultaneously by each work piece as it travels along the surface, and an electric control circuit with opposite sides connected to the different contacts whereby said circuit is closed by touching of both contacts simultaneously by each work piece.

5. The control signal apparatus described in claim 4 characterized by the two contacts being poles of different magnets.

6. The control signal apparatus described in claim 1 characterized by a plurality of contacts at spaced locations on said supporting surface.

7. The control signal apparatus described in claim 6 characterized by each of the contacts being a magnet for holding work pieces in paths adjacent to the supporting surface and in position to touch the contacts.

8. The control signal apparatus described in claim 1 characterized by a plurality of work stations between which work pieces move successively, supports between the different stations and along which the work pieces travel from one work station to another, at least one electric contact on the support and electrically insulated therefrom and located between every two work stations in the path followed by the work pieces whereby the contact is touched by a work piece during transfer from one work station to the next, an electric circuit closed by touching of the contact by the work piece, and control means responsive to the closing of the electric circuit.

9. The control signal apparatus described in claim 1 characterized by an automatic machine including power means for operating the machine, a controller that shuts off the power means and apparatus responsive to the establishing of a circuit through said contact by a work piece for preventing operation of the controller to shut off the power means.

10. The control signal apparatus described in claim 9 characterized by the automatic machine being one that operates through a cycle, the controller being conditioned by the machine at a predetermined time of the cycle to shut off the power means, but said controller having a time constant that delays its operation past the time that a work piece should pass the contact on said surface during normal and regular operation of the machine.

11. Control signal apparatus for an automatic machine having a work station and a surface along which a work piece travels after leaving the work station, an electric contact at a location on said surface in the path followed by the work piece, said contact constituting a raised area along the support, and being electrically insulated from the support, and a signal control circuit that is closed by contact of a work piece simultaneously with the support and the contact.

12. The control signal apparatus described in claim 11, characterized by a plurality of work stations at which a work piece is successively located during a manufacturing operation in a single machine, conveyor means for moving a work piece from each work station after each operation on the work piece at that station, there being at least one contact along the surface beyond each work station, and a control circuit for the contact beyond each station including the contact on one side of the circuit and the support and conveyor means on the other side.

References Cited in the file of this patent

UNITED STATES PATENTS

| | | |
|---|---|---|
| 2,290,930 | Wurzbach | July 28, 1942 |
| 2,356,266 | Ogilvie et al. | Aug. 22, 1944 |
| 2,373,582 | Kuehl | Apr. 10, 1945 |
| 2,383,313 | Hoffman et al. | Aug. 21, 1945 |
| 2,425,438 | O'Neal | Aug. 12, 1947 |
| 2,503,812 | Fath | Apr. 11, 1950 |
| 2,579,404 | Stevenson | Dec. 18, 1951 |
| 2,649,943 | Meyers | Aug. 25, 1953 |
| 2,731,204 | Darling et al. | Jan. 17, 1956 |
| 2,900,072 | Fully | Aug. 18, 1959 |
| 3,037,607 | Highfield et al. | June 5, 1962 |
| 3,044,508 | Sherman | July 17, 1962 |
| 3,068,733 | Held | Dec. 18, 1962 |
| 3,092,237 | Miller | June 4, 1963 |